Feb. 14, 1939.   J. E. BLOOMBERG   2,147,362
CUSHIONING MATERIAL
Filed Jan. 30, 1937

INVENTOR
JOSEPH E. BLOOMBERG
BY

*Louis O. French*

ATTORNEY

Patented Feb. 14, 1939

2,147,362

UNITED STATES PATENT OFFICE 2,147,362

CUSHIONING MATERIAL

Joseph E. Bloomberg, Milwaukee, Wis., assignor to Milwaukee Saddlery Company, Milwaukee, Wis., a corporation of Wisconsin Application January 30, 1937, Serial No. 123,139

1 Claim. (Cl. 106—23)

The invention relates to cushioning material.

The object of the invention is to provide a cushioning material of simple and economical construction and which is formed of material ordinarily wasted. More particularly the present invention provides a cushioning material formed of small scraps or pieces of sponge rubber which in one instance are bound together into a composite cushion by a latex binder forming a coating for these pieces and which in another instance are bound together with a latex binder and a fibrous filler material such as animal hair, jute, hemp, sisal, long fiber moss or a mixture thereof, or other suitable fibers, the composite cushioning material being readily adapted to be cut up or otherwise formed into seat cushions of various kinds.

The invention further consists in the several features hereinafter set forth and more particularly defined by the claim at the conclusion hereof.

Figure 1:
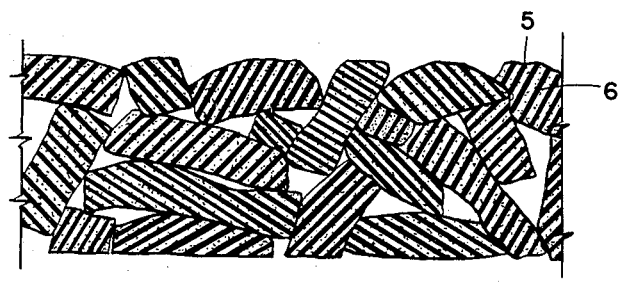
Fig. 1 is a vertical sectional view of one form of material embodying the invention.

Referring to Fig. 1 of the drawing, the cushioning material is formed of small pieces of sponge rubber 5, these pieces having one or more sides with exposed pores 6. These pieces are each coated with a suitable latex binder in any suitable manner, and the coated pieces are then placed in a suitable form of the desired height or depth and size or shape. The coated bodies or pieces of sponge rubber are then secured to each other by the cold vulcanizing action of the latex binder, it being noted that this binder is free to penetrate into the exposed pores of the pieces. The block thus formed may be the same size and shape as the desired cushion, or the cushions may be cut from a relatively large block to the desired shape.

Figure 3:
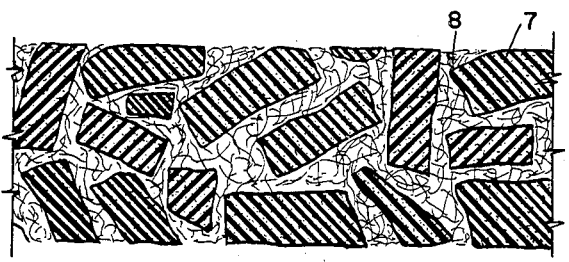
Fig. 3 is a vertical sectional view of another form of cushioning material embodying the invention.
Figure 2:
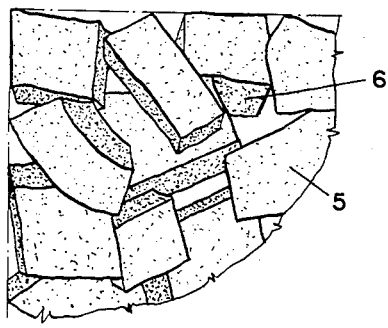
Fig. 2 is a detail plan view of the material shown in Fig. 1.

The cushioning material shown in Fig. 3 of the drawing is like the first construction formed of small pieces of sponge rubber 7 coated with a latex binder and cold vulcanized, but in addition a filler 8 of fibrous material is provided. This filler may be animal hair, jute, hemp, sisal, long fiber moss, or a mixture of two or more of these fibers which is also mixed with the latex binder. The sponge rubber pieces with the filler material between them is placed in a suitable form, and the mass is formed into a composite material by the cold vulcanizing action of the binder. The percentage of filler material to the sponge rubber may be varied depending upon the desired resiliency of the cushion and may vary from fifty per cent to twenty-five per cent of the volume of the composite mass.

The cushioning material above described provides a use for small pieces of sponge rubber which are ordinarily thrown away as waste, and at the same time a cushioning material is provided that may be readily formed or cut into desired shapes.

I desire it to be understood that this invention is not to be limited to the details of construction hereinbefore set forth except in so far as such limitations are included in the claim.

What I claim as my invention is:

As a new article of manufacture, a cushioning material comprising small pieces of sponge rubber having one or more sides with exposed pores, a fibrous filler between the pieces and a latex binder securing said pieces and filler together in a composite mass, said filler being from fifty to twenty-five per cent by volume of the composite material.

JOSEPH E. BLOOMBERG.